United States Patent [19]
Fattaleh

[11] 3,921,298
[45] Nov. 25, 1975

[54] DENTAL AND SURGICAL APPLIANCE

[76] Inventor: John B. Fattaleh, 4845 E. Indian School Road, Phoenix, Ariz. 85018

[22] Filed: Mar. 26, 1974

[21] Appl. No.: 454,812

[52] U.S. Cl. .................................................. 32/59
[51] Int. Cl.² .......................................... A61C 3/06
[58] Field of Search ...................... 32/58, 27, 26, 59

[56] References Cited
UNITED STATES PATENTS 3,098,299   7/1963   Page ....................................... 32/27
3,195,537   7/1965   Blasi ....................................... 32/27

*Primary Examiner*—Robert Peshock
*Attorney, Agent, or Firm*—Warren F. B. Lindsley

[57] ABSTRACT

A slim line hand held battery operated dental and surgical tool characterized by its compactness, lightweight and slender outline which when enhanced by its ease of manipulation makes it possible to accomplish dental and surgical functions heretofore difficult to achieve.

10 Claims, 9 Drawing Figures

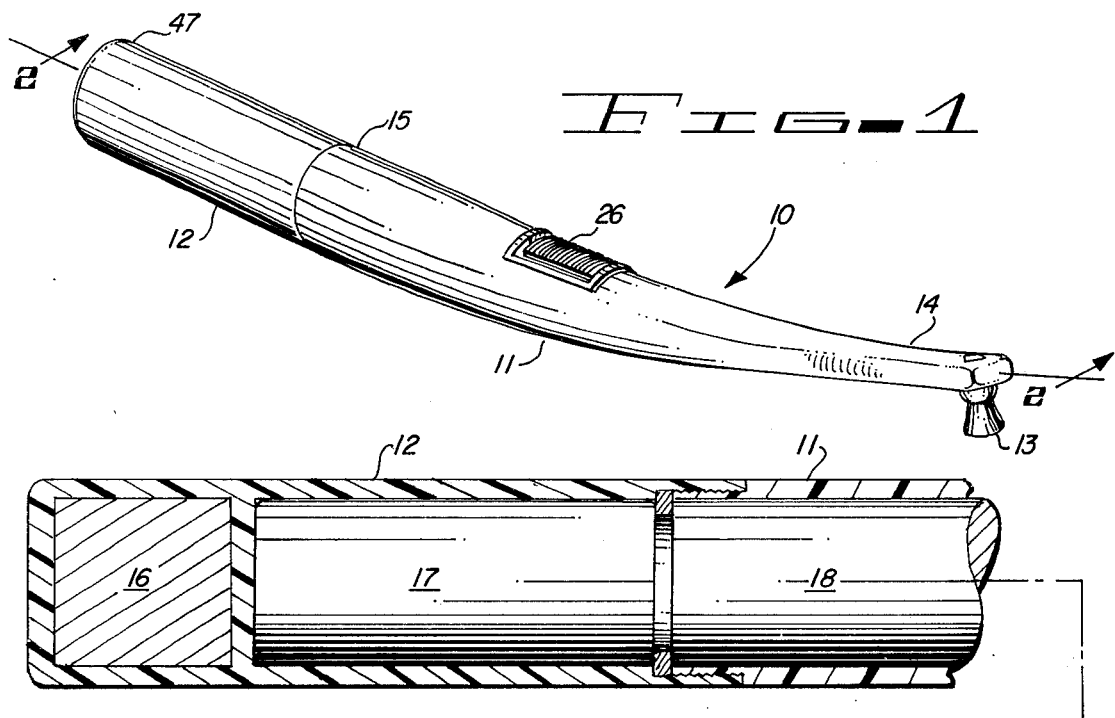
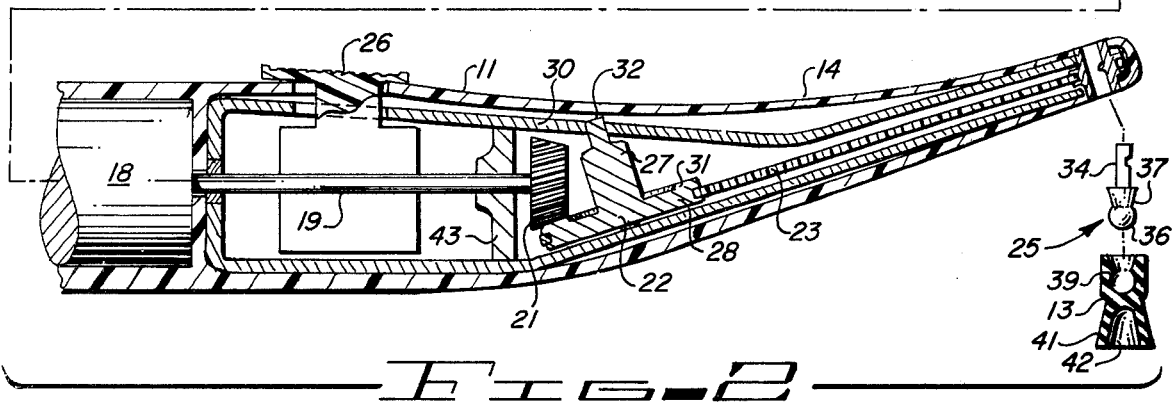
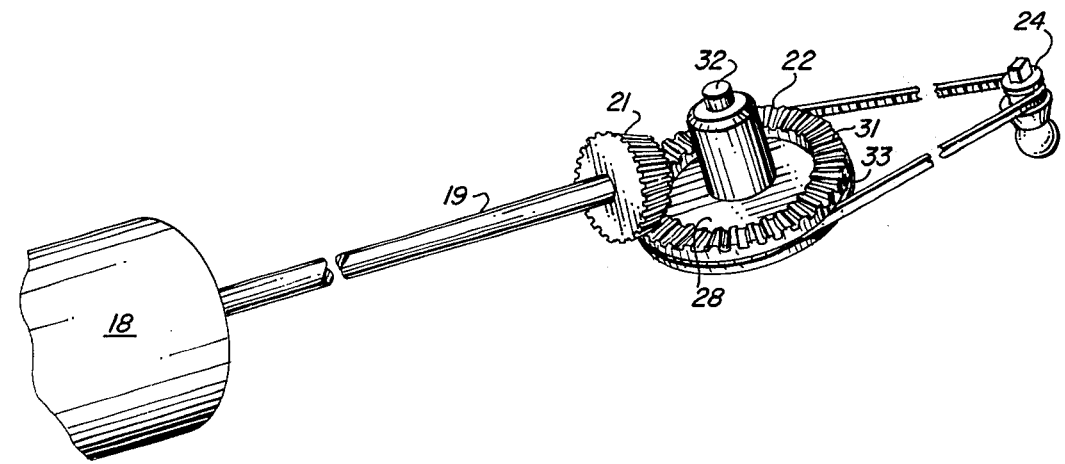

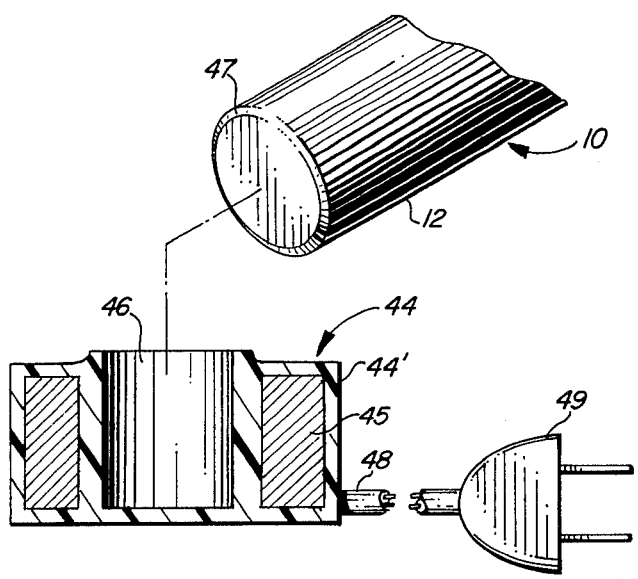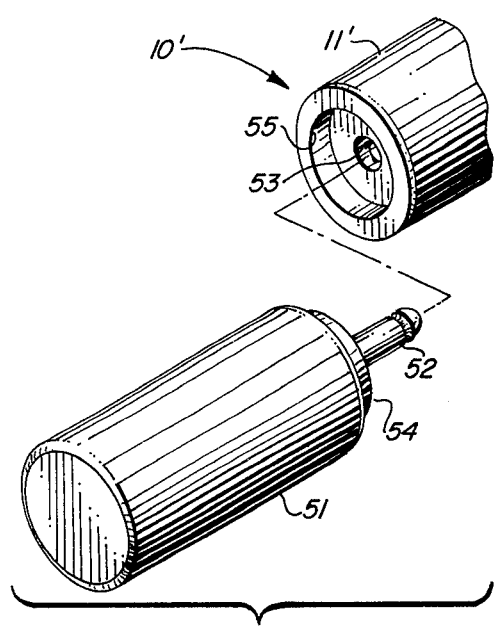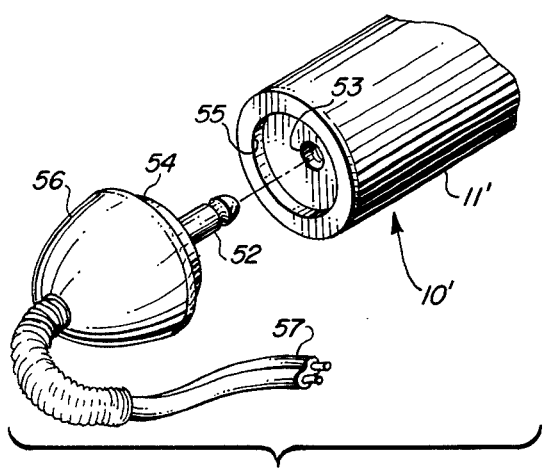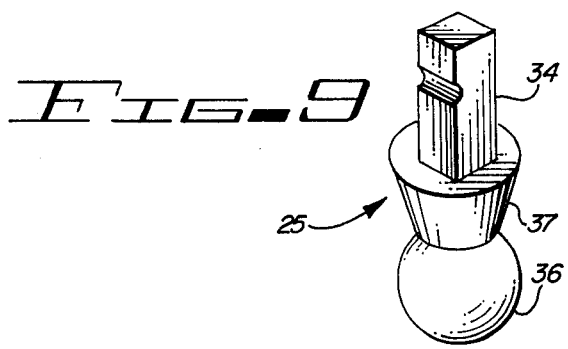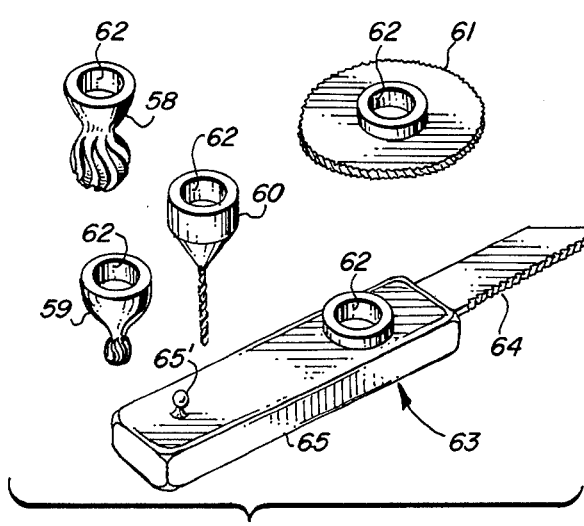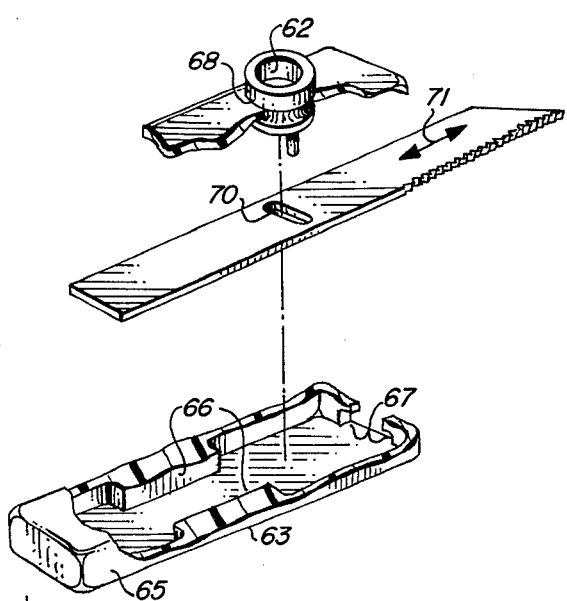

DENTAL AND SURGICAL APPLIANCE

BACKGROUND OF THE INVENTION

Recent advances in dental technology have contributed immeasureably toward improved dental care and reduced pain and discomfort of the patient during treatment. The discovery of anesthesia, beginning with the first use of nitrious oxide gas (laughing gas) in 1844 for tooth extraction followed by the use of ether as an anesthetic during surgery has brought relief from the severe pain which otherwise attends such major dental operations. The discovery of the X-ray in 1895 provided a means for discovering decay in its early stages. Quieter, faster rotary cutting equipment developed in the 1950's has alleviated the discomfort associated with drilling in preparation for the filling of cavities. Modern dental hand pieces operating at speeds in excess of 500,000 revolutions per minute greatly reduce the vibration heretofore the chief causes of pain.

While the effectiveness of this modern high speed equipment leaves little to be desired in terms of performance, technology developments in other fields have opened up new opportunities to provide equipment affording a higher degree of operating convenience and patient comfort.

One of the disadvantages of present day dental equipment is the connection of the rotational drive means to a hand held instrument. This is ordinarily accomplished either through the use of a flexible shaft or by means of a system of belts and pulleys supported by a number of pivotally connected lever arms and air driven turbines. Such an arrangement tends to get in the way of the dentist, surgeon or technician who must constantly maneuver the shaft or pulley drive system to prevent interference with his work.

Another disadvantage is the lack of portability of the equipment. This is even a problem in the usual environment of the dental office and particularly when the patient must be moved to use the instrument.

Still further, most self contained power driven instruments are bulky in size and cannot easily reach cavities in the mouth or are delicate enough to provide small incisions, if the instrument is a cutting tool.

Recent advances in the development of small rechargeable batteries have permitted their application to a number of portable cordless electric appliances including toothbrushes, grass clippers and carving knives and the desirability of further extending the application of such batteries to include a battery operated dental drill, polisher and surgical cutting tool is needed.

SUMMARY OF THE INVENTION

In accordance with the invention claimed, a cordless electric appliance such as, for example, a dental drilling, polishing and cutting appliance is provided which effectively overcomes the important disadvantages associated with conventional dental tools currently used.

It is, therefore, one object of this invention to provide an improved slim line electric appliance for rotary drilling, cutting and polishing operations.

Another object of this invention is to provide a novel electric battery operated appliance utilizing a mechanical driving means which may be concealed within a compact, slender, tapered housing with the tool at its tapered end which permits easy access to all areas surrounding the patients' teeth and gums.

A further object of this invention is to incorporate in the design of such an appliance a means for the quick and easy replacement of a discharged or worn out battery or for the temporary attachment of a power cord in an emergency situation in which replacement batteries might not be available.

A still further object of this invention is to provide in such an appliance a means for attaching a reciprocating mechanism to permit its use as a cutting tool, chisel or tamping device.

A still further object of this invention is to provide a portable hand held power driven tool for preventive dental care such as a tooth cleaning and polishing device for use in the home, office, etc.

A still further object of this invention is to provide a hand held electric self contained appliance which is particularly slim at its tool supporting end for reaching into cavities hard to reach of the human body, such as the mouth.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which:

FIG. 1 is a perspective view of a cordless electric appliance embodying the invention.

FIG. 2 is an enlarged broken cross-sectional view of the appliance shown in FIG. 1 taken along line 2—2.

FIG. 3 is a perspective view illustrating the mechanical drive train which couples the electric motor shaft to a rotating tool.

FIG. 4 illustrates the battery end of the appliance shown in FIG. 1 in relationship with a recharging unit equipped to be energized from a conventional alternating current wall outlet.

FIG. 5 illustrates the battery housing in relationship with a modified main housing of the appliance shown in FIG. 1.

FIG. 6 illustrates an alternate means of energizing the appliance shown in FIG. 5 by means of a power cord.

FIG. 7 illustrates a variety of cutting heads and accessories which may be utilized with the appliances shown in FIGS. 1, 5 and 6.

FIG. 8 illustrates the mechanical arrangement employed for providing reciprocating action required for use with attachments such as cutting blades or tamping devices.

FIG. 9 is an enlarged view of the chuck shown in FIG. 2.

DESCRIPTION OF THE PREFERRED EMBODIMENT

Referring more particularly to the drawing by characters of reference, FIG. 1 illustrates a cordless electric dental drilling and polishing appliance 10 in a slender, slim line elongated housing comprising a main housing 11, a detachable battery housing 12, and a rotary polishing cup 13 mounted at the tapered tip end of a long slender neck section 14 of housing 11.

The battery housing is cylindrical in form and of suitable dimensions to contain a commercially available battery of appropriate rating to operate the appliance.

The main housing 11 tapers from a circular cross-sectional configuration at its end 15 which attaches to battery housing 12 to a slender configuration having approximately a rectangular or square cross-section in the area of neck 14. The dimensions of neck 14 of housing 11 are large enough to house the mechanical drive train incorporated within apparatus 10 for driving head 13 but small enough to readily fit into the cavities of the mouth. The slender neck area 14 is provided with a slight concave configuration as shown to make it easier to handle, manipulate and fit into the mouth of the patient.

The internal parts contained within battery housing 12, as illustrated by the cut-away view of FIG. 2, include a charging cell 16 and a battery 17. The recharging cell 16 contains a transformer secondary winding and rectifiers which supply charging current to battery 17 during recharging operations.

The main housing 11 contains a direct current motor 18 having a shaft 19 projecting forwardly toward neck 14 and carrying at its forward end a bevel gear 21. A gear-and-pulley combination 22 is in meshing engagement with bevel gear 21 and drives a drive belt 23, pulley 24 and accessory chuck 25.

These parts and their orientation relative to each other are illustrated in more detail in FIG. 3.

Motor 18 is normally energized from battery 17 with connection between motor 18 and battery 17 controlled by on/off switch 26. Bevel gear 21 is fixedly attached to shaft 19 and rotates at the same rate as shaft 19 of motor 18. Gear-and-pulley combination 22 has the form of a wheel-and-hub arrangement with hub 27 projecting above the upper plane surface of wheel 28. About the periphery of the top surface of wheel 28 is a set of gear teeth 31 appropriately dimensioned to mesh with the teeth of bevel gear 21. Gear-and-wheel combination 22 is rotatably anchored by means of an axle 32 to the top and bottom walls of an inner housing or frame 30 which extends around and supports shaft 19 and its power train, as shown. The plane of wheel 28 lies parallel to the beveled edge of gear 21 at the point on the underside of gear 21 at which teeth 31 are engaged by the teeth of gear 21. By virtue of the special design of the gear-and-pulley combination 22 which allows this manner of orientation with respect to gear 21, these two parts are compactly arranged within housing 11. It should be recognized that frame 30 may be omitted in order to slim down further the housing with the gear and wheel combination 22 being anchored directly to the inside surface of the housing.

Pulley 24 which is rotatably mounted in the tip of neck 14 is coupled to gear-and-pulley combination 22 by means of drive belt 23. Wheel 28 has an annular groove 33 cut into the cylindrical surface of its rim to accommodate belt 23 which is also engaged by pulley 24.

Because pulley 24 has a substantially smaller diameter than wheel 28, pulley 24 turns at a proportionately higher speed than wheel 28 or gear 21. Thus, for a given speed of rotation for pulley 24 which is desirably high, the speed of rotation of gear 21 and the speed of gear-and-pulley combination 22 are relatively low with the lower speeds contributing toward reduced wear and longer life of these parts.

Accessory chuck 25 has a non-cylindrical upper end 34 which fits snugly inside a similarly shaped hollow axis of pulley 24 from either side of the housing and is secured therein by its shape. If the upper end 34 of chuck 25 is cylindrical, it may be secured in the hollow axis of pulley 24 by means of a rectangular key which is driven into a keyway or slot. This slot (not shown) runs lengthwise along the portion of chuck 25 which fits inside pulley 24. The lower end of chuck 25 is a spherical knob 36 topped by a flared crown 37. Knob 36 and its flared crown 37 are shaped to conform with the inner surfaces of a complementary cavity 39 formed inside the top part of accessory 13. Accessory 13 is molded from hard rubber of from a plastic material of similar mechanical properties and the dimensions of cavity 39 are appropriate to permit knob 37 to be forced inside cavity 39. The elastic gripping action of the rubber or plastic material from which accessory 13 is formed thus fixedly attaches accessory 13 to chuck 25.

Accessory 13 is a conventional polishing attachment having as its working end a flared crown with a cavity 42 opening outwardly therefrom. Flexible ribs arranged radially inside cavity 42 act as polishing vanes and aid in keeping paste containing an abrasive powder inside cavity 42 between the radial vances and is worked out of cavity 42 as accessory 13 rotates and is pressed against the patient's teeth.

Motor shaft 19 may be rotatably supported at its forward end by a transverse rib 43 secured within inner housing or frame 30.

The on/off switch 26 may be replaced if desired by a more elaborate control incorporating a vairable resistance for the adjustment of motor speed.

A battery charging unit 44 comprising a housing 44' is shown in FIG. 4 and comprises a coil shaped primary winding 45 mounted in housing 44' surrounding a cylindrical cup-shaped cavity 46. The open end of cavity 46 is suitably dimensioned to receive without interference the butt-end 47 of appliance 10. Primary winding 45 is connected to a conventional appliance cord 48 terminated in a plug 49 of the type designed to be plugged into a utility outlet to permit energization of winding 45 from a common utility power source.

To recharge battery 17, butt end 47 of appliance 10 is inserted in cavity 46 with winding 45 energized. The secondary winding contained within recharging cell 16 is located inside butt end 47 of appliance 10 and is thus positioned within cavity 46 where it is linked by magnetic flux lines set up by primary winding 45. The a-c voltage thereby induced in the secondary winding of the recharging cell 16 is rectified and delivered as a d-c charging current to battery 17.

FIG. 5 illustrates a variation of the structure shown in FIGS. 1–4 wherein the battery housing 12 of apparatus 10 with its built in charging cell 16 is replaced by a smaller battery housing 51 which is just large enough to contain a battery. In the utilization of this variation of the invention the battery contained within housing 51 is charged in a separate battery charger.

Because there is no built in charging cell within housing 51, housing 11' and consequently the length of the modified apparatus 10' is smaller, lighter and somewhat more convenient to use. Housing 51 in this case is equipped with a quick-disconnect jack 52 which fits into a socket 53 in the rear end of main housing 11'. The other battery connection is made by pressure contact between the outer surface of ring 54 on housing 51 which is in contact with the battery case and the inner surface of ring 55 on main housing 11'. Ring 54 is thrust inside ring 55 in a pressure fit when battery housing 51 is attached to main housing 11' to energize motor 18 by simply plugging connector 52 into socket 53. This variation permits the dentist to simply replace a depleted battery very quickly and continue his work with a fresh battery while the depleted battery is either discarded or being recharged.

FIG. 6 illustrates another variation of the invention wherein appliance 10' is utilized without a battery. In this case, a direct current voltage is supplied to a plug 56 through an insulated two wire power cord 57 from a remote transformer-rectifier (not shown). Connection between plug 56 and main housing 11' is again made by means of jack 52 and ring 54 which snap inside a socket 53 and ring 55 at the rear of main housing 11'. This variation may be provided as an added accessory feature with the battery operated unit. Because of the absence of batteries, an additional reduction in weight and length is realized, but the operator must now contend with the electric cord 57. Another advantage of this feature is that it allows appliance 10' to be utilized if the operator has run out of charged batteries.

FIG. 7 illustrates a variety of implement attachments which may be utilized with appliances 10 and 10' in place of the polishing cup 13 shown in FIGS. 1 and 2. Four of these attachments shown, merely for purposes of illustration, comprise a relatively large cutting burr 58, a relatively small cutting burr 59, a drill 60 and a circular cutting blade 61 and are operated by direct attachment to chuck 25. Elastic inserts inside similarly shaped cavities 62 of burrs 58 and 59, drill 60 and blade 61 grip knob 36 in the manner of polishing cup 13. The fifth attachment is a reciprocating cutting saw 63 which has a blade 64 held within a housing 65. Attachment 63 is provided with a cavity 62 at one end which again snaps over knob 36 of chuck 25 while at its other end, it is provided with a snap-in alignment and mounting pin 65' which is provided for mounting housing 65 on appliances 10 and 10' by snapping into a socket located in the underside of neck 14 of housing 11 and 11' to the rear of pulley 24.

The means by which the reciprocating action is supplied to blade 64 is illustrated in FIG. 8. As shown, blade 64 is restrained within housing 65 by shoulders 66 and slot 67 formed therein which permit only longitudinal motion of blade 64. A pulley 68 which is rotationally mounted on the top surface of housing 65 is provided with a socket 62 for gripping knob 36 of chuck 25. Pulley 68 has projecting inwardly from housing 65 of its lower end a non-concentrically located pin 69 which moves in a circular path when pulley 68 is turned by chuck 25. Pin 69 fits inside a transverse slot 70 appropriately located in blade 64. By virtue of the restraints provided by shoulders 65 and slot 67 and because slot 70 offers no interference with the transverse component of the circular path taken by pin 69, only the longitudinal component (in the direction 71) of the motion of pin 69 is transmitted to blade 64. This motion constitutes the desired reciprocating action required.

Thus, a portable, lightweight dental drilling appliance is provided which is unencumbered by the usual flexible shaft or belt-and-pulley power train. Through the use of rechargeable or replaceable batteries a convenient and completely safe power source is made available. A variety of accessories for polishing, cutting and drilling may be utilized with the appliance.

Although but a few embodiments of the present invention have been illustrated and described, it will be apparent to those skilled in the art that various changes and modifications may be made therein without departing from the spirit of the invention or from the scope of the appended claims.

It should be recognized that the feature of attaching chuck 25 and housing 65 to pulley 24 from either side of housing 11 makes it possible to utilize the arcuate configuration of the housing to advantage in hard to reach work areas.

Further, although the preferred embodiment show and describes a belt driven pulley 24, a suitable shaft could be used as the rotating power source in place of pulley 24 directly driven from gear 21 and wheel 28, if so desired.

What is claimed is:

1. A medical-dental tool comprising:
   an elongated hollow housing tapering from a hand gripping, cylindrically shaped first end to a blunt, narrow implement supporting end having a rectangular or square cross-sectional configuration, said housing having an arcuate configuration between its ends,
   said housing comprising a first portion adjacent its first end,
   power means mounted within said first portion to provide a balanced handle for said tool having an optimum weight distribution,
   said power means comprising a direct current motor and a battery for energization thereof,
   a switch mounted on the outer periphery of said first section to control said motor,
   a drive pulley mounted in said housing at the implement supporting end,
   a gear reduction drive mounted within said housing for connecting said motor to said drive pulley,
   an implement mounting means provided adjacent said implement supporting end on the concave surface of said arcuate configuration within the outline of said housing for engaging and being driven by said drive pulley, and
   a drive belt within said housing for connecting said drive pulley to said power means,
   said drive belt being driven in a straight line through said arcuate configuration of said housing.

2. The medical-dental tool set forth in claim 1 wherein:
   said implement mounting means comprises a socket extending through said housing for selectively receiving implements on opposite sides of said housing.

3. The medical-dental tool set forth in claim 1 wherein:
   said first portion of said housing comprises a compartment for containing a battery charging means at said first end of said housing in axial alignment with a battery for operating said direct current motor forming a part of said power means,
   said charging means comprising one coil of an electric power rectifying means.

4. The medical-dental tool set forth in claim 3 wherein:
   a section of said first portion of said housing containing said battery charging means and said battery is detachably connected to the remainder of said housing.

5. The medical-dental tool set forth in claim 4 wherein:
   the disconnecting end of said remainder of said housing is provided with means for conductively receiving and releasing an add-on battery.

6. The medical-dental tool set forth in claim 5 wherein:
said means for conductively receiving and releasing an add-on battery comprises a receptacle for receiving a quick-disconnect jack of the add-on battery.

7. The medical-dental tool set forth in claim 1 wherein:
said power means comprises means for converting rotary motion of said pulley into reciprocating motion of said implement mounting means.

8. The medical-dental tool set forth in claim 7 wherein:
said means for converting rotary motion of said pulley into reciprocating motion of said implement mounting means comprises an elongated pocket for clamping on the tapered end of said housing and in mechanical connection with said drive pulley.

9. A medical-dental tool comprising:
an elongated hollow housing tapering uninterruptedly from a hand gripping first end to a blunt, narrow implement supporting end and having an arcuate configuration therebetween,
said housing comprising a cylindrical first portion adjacent its first end,
power means mounted within said first portion to provide a balanced handle having an optimum weight distribution,
a switch mounted on the outer periphery of said first section to control said motor,
a driving means mounted in said housing at the implement supporting end thereof,
a gear reduction drive mounted within said housing for connecting said motor to said driving means,
an implement mounting means provided adjacent said implement supporting end on the concave surface of said arcuate configuration within the outline of said housing for engaging and being driven by said driving means, and
connection means within said housing for connecting said driving means to said power means,
said connecting means extending in a straight line through said arcuate configuration of said housing.

10. A medical-dental tool comprising:
an elongated hollow housing tapering from a hand gripping, cylindrically shaped first end to a blunt, narrow implement supporting end and having an uninterrupted cylindrical arcuate configuration therebetween,
said housing comprising a first portion adjacent its first end,
power means mounted within said first portion to provide a balanced handle having an optimum weight distribution,
a switch mounted on the outer periphery of said first section to control said motor,
a driving means mounted in said housing at the implement supporting end thereof,
a gear reduction drive mounted within said housing for connecting said motor to said driving means,
an implement mounting means provided adjacent said implement supporting end on the concave surface of said arcuate configuration within the outline of said housing for engaging and being driven by said driving means, and
connection means within said housing for connecting said driving means to said power means.

* * * * *